United States Patent [19]

Yueh

[11] 3,723,409

[45] Mar. 27, 1973

[54] MIXED DERIVATIVES OF POLYGALACTOMANNANS AND PROCESS OF PREPARING SAME

[75] Inventor: Mao H. Yueh, Minneapolis, Minn.

[73] Assignee: General Mills, Inc., Minneapolis, Minn.

[22] Filed: May 26, 1970

[21] Appl. No.: 40,746

[52] U.S. Cl.................260/209 R, 99/136, 99/139, 99/144, 424/70
[51] Int. Cl.................................C07c 47/18
[58] Field of Search.................260/209 R, 234 R

[56] References Cited

UNITED STATES PATENTS

| 2,477,544 | 7/1949 | Moe | 260/209 R |
| 2,523,708 | 9/1950 | Moe | 260/234 R |
| 2,602,789 | 7/1952 | Schwartz et al. | 260/234 R |
| 3,326,890 | 6/1967 | Engelskirchen et al. | 260/209 R |
| 3,350,386 | 10/1967 | Engelskirchen et al. | 260/209 R |
| 3,467,647 | 9/1969 | Benninga | 260/209 R |

*Primary Examiner*—Lewis Gotts
*Assistant Examiner*—Johnnie R. Brown
*Attorney*—Anthony A. Juettner and Gene O. Enockson

[57] ABSTRACT

Carboxyalkyl hydroxyalkyl derivatives of polygalactomannans are prepared by reacting the polygalactomannan with both an alkylene oxide of three to eight carbon atoms and a halo fatty acid of two to four carbons or the alkali metal salts thereof. The products find use as thickeners for aqueous fluids when complexed with di- or polyvalent metal ions.

2 Claims, No Drawings

MIXED DERIVATIVES OF POLYGALACTOMANNANS AND PROCESS OF PREPARING SAME

The present invention relates to new derivatives of polygalactomannans and to the process of preparing such derivatives. More particularly, it relates to certain hydroxyalkyl polygalactomannans further substituted with carboxyalkyl groups.

Hydroxyalkyl ethers of polygalactomannans, and especially guar gum, have been made by the reaction of the polygalactomannans with an alkylene oxide which has at least 3 carbon atoms (about 0.1 to 6.0 equivalents per equivalent of the polygalactomannan). Such hydroxyalkyl polygalactomannans have found use as thickeners for various products including foods, cream type shampoos and the like. While said hydroxyalkyl polygalactomannans thicken aqueous systems to a certain degree, it would be desirable to increase the ability of the same so that even lower quantities could be utilized.

In an attempt to increase the viscosity promoting properties of the hydroxyalkyl polygalactomannans, divalent cations—i.e. calcium$^{++}$—were added to the aqueous sols thereof. No increase in viscosity was noted. Calcium ions were tried since they cause the sols of carboxyalkyl derivatives of polygalactomannans having a D.S. of 0.6 and over to greatly increase in viscosity. These carboxyalkyl derivatives are effectively thickened only by calcium ions and, additionally, the thickening action is somewhat difficult to control. Thus inadequate mixing or the addition of a little too high an amount of the calcium$^{++}$ may cause loss of viscosity or even precipitate formation. Once an aqueous system is thickened by the Ca$^{++}$-carboxyalkyl galactomannan complex, it retains substantially all of its increased viscosity even when the system is heated. This property is desirable in certain fields such as foods which are to be eaten hot but yet retain their thickness—i.e. cream sauces, stews and the like. In other respects, products capable of losing viscosity on being heated are also needed.

I have now discovered that hydroxyalkyl polygalactomannans further substituted with carboxyalkyl groups have unexpected properties. Thus the viscosity of aqueous sols thereof is substantially increased by the addition of a variety of di- and polyvalent metal ions and not just Ca$^{++}$. Additionally, this thickening or complexing reaction is more easily controlled than with carboxyalkyl polygalactomannans—i.e. precipitate formation can be more readily avoided. Of equal importance, the thickening provided by the di- or polyvalent metal ion-carboxyalkyl hydroxyalkyl polygalactomannan system is lost on heating of the aqueous system containing same. Thus the products find value in canning and other processing operations where the food is to be eaten at about room temperature or colder but the processing thereof is at higher temperatures where low viscosity is desired.

The products of the present invention are preferably prepared by first reacting the polygalactomannan with the alkylene oxide and then reacting the resulting hydroxyalkyl polygalactomannan with a halo fatty acid reactant. The useful alkylene oxides are those having three to eight carbon atoms. Generally, the oxirane group is a terminal vicinal epoxy group. Such alkylene oxides may be represented by the following formula:

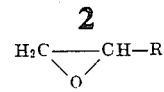

where R is an alkyl group having 1 to 6 carbon atoms. R is preferably methyl, such as propylene oxide. R may also, however, be ethyl, propyl, butyl, amyl, hexyl and the like.

Basically, the hydroxyalkyl ethers are prepared by the reaction of the polygalactomannan with the alkylene oxide in the presence of an alkaline catalyst. Commercially available guar gum generally contains from about 8 to 15 percent moisture by weight. For convenience the hydroxyalkyl ether preparation will hereinbelow be described with reference to guar gum and propylene oxide to provide the hydroxypropyl ether or polyhydroxypropyl ether of guar gum. The rate of reaction is dependent on the catalyst concentration and the temperature. Temperatures substantially higher than room temperature will generally require pressure equipment or solvent reflux. Average reaction efficiency is in the range of 60 to 80 percent. The reaction may be illustrated in its simplest, idealized form by the following equation:

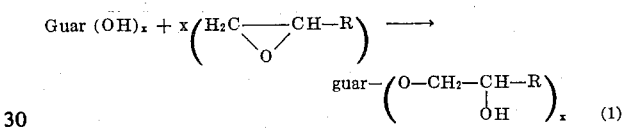

(1)

"Guar" in the formula represents guar minus x number of hydroxyl groups capable of reacting with the alkylene oxide and x is an integer from 1 to 3 for an anhydrohexose unit of guar.

In guar gum, for example, the basic unit of the polymer is comprised of two mannose units with a glycosidic linkage and a galactose unit attached to one of the hydroxyls of the mannose units. On the average, each of the sugar units has three available hydroxyl sites, all of which are capable of reaction. In addition, a new hydroxyl group is formed with each alkylene oxide group and it too can react. In respect of the above formula (1), x is an integer of from 1 to 3 in any one sugar unit of the guar gum. It is also possible that the alkylene oxide may react with a newly formed OH formed from a first condensation of the alkylene oxide with the OH of the sugar unit. In such case the product can be represented by the formula:

(2)

where x is an integer up to 3 and y is an integer dependent on the second or further additions of alkylene oxide.

The term "polygalactomannans" as used herein includes the general class of polysaccharides containing both galactose and mannose units. The polygalactomannans are usually found in the endosperm sections of leguminous seeds such as guar, flametree and Cassia occidentalis. The invention has particular value in providing new mixed derivatives of guar gum due to the ready availability of the same.

As indicated, the reaction of the alkylene oxide with the polygalactomannan may be conducted at room temperature or elevated temperatures. At room temperature, the reaction is relatively slow. A general temperature range would be from about 17° C. to about 100° C. While higher temperatures might sometimes be used, such as up to 125° C., there is generally no advantage thereto and higher temperatures may have an adverse effect on color of the product. Where temperatures other than room temperature are employed, temperatures on the order of about 50°–100° C. are generally used.

The reaction is carried out using an alkaline catalyst. Such catalysts are in general the alkali metal or alkaline earth metal hydroxides, such as sodium, potassium or calcium hydroxide. Ammonia may also be used. No special advantage, however, is obtained by the use of more exotic basic or alkaline catalysts over the use of NaOH which is the most commonly available alkaline catalyst. In general, however, it is only necessary that an alkaline catalyst be present, and the process is not restricted to the use of any specific such catalyst although NaOH is preferred.

Only small amounts of the catalyst need be employed. Thus it is generally not necessary to exceed 10 percent by weight of the polygalactomannan, although larger amounts might be used. A preferred range is 0.1 to 5 percent by weight of the polygalactomannan.

The pressure used in preparing the hydroxyalkyl ether is not critical and reflux conditions can be employed. The time of reaction is generally dependent on the temperature, amount of reactants and the degree of reaction desired. Under the slowest conditions, times up to 100 hours may be required. Generally, at least about one hour is required, although under certain conditions shorter time periods may be employed. In many instances, reaction times of from 1 to 15 hours are employed.

The reaction of the polygalactomannan and alkylene oxide may be conducted in the substantial absence of water or solvent (no water added) although the efficiency of reaction is very low without the addition of water. In the absence of other solvents, catalytic amounts of water on the order of about 3 to 8 percent based on the polygalactomannan are preferably employed, these small amounts generally being employed where higher temperatures are used. Where lower temperatures and atmospheric pressure are used, generally larger amounts of water will be employed. Further, it is preferred to utilize organic solvents, either water-miscible or water-immiscible. Illustrative of such organic solvents are isopropanol (water-miscible) and heptane (water-immiscible). Other unreactive organic solvents may be employed although the two mentioned are preferred. Such other organic solvents are the common aliphatic hydrocarbons having from five to 10 carbon atoms which are commercially available, such as heptane and hexane. Alkanols higher than methanol, those having from 2 to 6 carbon atoms, may also be employed, such as t-butanol. When employed with a solvent, such as isopropanol or heptane, from 10 to 80 percent water based on the weight of the polygalactomannan is preferably used, with from 30 to 70 percent being most desirable with the water-miscible solvents and 20 to 30 percent being most desirable with the water-immiscible solvents.

Where organic solvents are used, they are preferably employed in an amount up to about eight times the weight of the polygalactomannan. Preferably, with the water-miscible solvents, an amount of from about one to three times the weight of the polygalactomannan is used. With water-immiscible solvents, an amount of from about three to five times the weight of the polygalactomannan is preferably employed.

After the completion of the reaction of the polygalactomannan and the alkylene oxide, the resulting hydroxyalkyl product may optionally be dried, with or without washing and neutralized such as with an acid—i.e. acetic, hydrochloric or the like. However, the product may then be reacted directly with the halo fatty acid reactant.

Suitable halo fatty acids include chloroacetic acid, chloropropionic acid, chlorobutyric acid and the like. The said halo fatty acids can have two to four carbon atoms in the fatty chain. The said acids are preferably used in the form of the alkali metal salts thereof. As such, it is preferred to use the sodium salts and sodium chloroacetate is the particularly preferred reactant.

The reaction with the halo fatty acid reactant is carried out using an alkali metal hydroxide as a reaction initiator. Thus it is preferred to use sodium hydroxide and the same apparently functions by first forming alcoholate groups with the hydroxyls of the polygalactomannan, which alcoholate groups are capable of ready reaction with the halo fatty acid reactant.

The halo fatty acid reactant is used in an amount of 55 to 190 parts, preferably 90 to 110 parts, per 100 parts by weight of the polygalactomannan. The alkali metal hydroxide is added in an amount of 20 to 65, preferably 38 to 46, parts by weight per 100 parts of the polygalactomannan. The alkali metal hydroxide is added as an aqueous solution, preferably up to 73 percent by weight concentration.

The reaction of the halo fatty acid reactant with the polygalactomannan is preferably carried out by dry blending the said reactants and then slowly adding the alkali metal hydroxide solution. After addition of the hydroxide, the mixture is agitated and then heated for a period of time. The temperature and time are variable, such as at room temperature for one day but preferably 50°–60°C. for a few hours,—i.e. 1 to 5. If too much water is used, the product fuses to a viscous dough which cannot be easily handled.

The resulting product can be used as such but is optionally and preferably neutralized with an acid such as acetic acid, hydrochloric acid and the like and then dried with or without washing such as with aqueous methanol.

The following examples serve to illustrate certain preferred embodiments of the invention without being limiting.

EXAMPLE A

To a 20 ft.$^3$ ribbon blender pressure reactor were charged 400 lbs. guar flour and 12 lbs. NaOH in 320 lbs. water. The latter basic solution was sprayed onto the flour as the same was agitating in the blender. The reactor was then evacuated, purged with $N_2$, and again evacuated. 87 lbs. propylene oxide (1:1 equivalent ratio with the guar) were then pumped in and the reaction mass heated to 50° C. over a 25-minute period. The reaction temperature was allowed to rise to 70°C.

over a 20-minute period after which the product was cooled until the reactor pressure fell below 0 psig. (15 minutes). The product was then neutralized with 18.5 lbs. glacial acetic acid, flaked, dried and coarsely ground.

EXAMPLES B-G

Example A was essentially repeated using varying equivalents of propylene oxide per equivalent of guar flour:

| Example | Equivalents Propylene Oxide |
|---|---|
| B | 0.4 |
| C | 0.75 |
| D | 1.0 |
| E | 1.2 |
| F | 1.8 |
| G | 3.0 |

EXAMPLE H

Example A was essentially repeated except that locust bean gum was used instead of guar gum.

Two hundred grams of the hydroxypropyl guar derivative of Example A and 200 grams sodium chloroacetate were stirred continuously in a one-quart Readco Z-arm mixer while 72 grams sodium hydroxide dissolved in 140 ml. of water was added during 30 minutes at room temperature. Stirring was continued while the mixture was heated at 60°C. for 2 ½ hours. Approximately one half of the mixture was allowed to stand overnight at room temperature and the rest was neutralized with acetic acid, washed three times with 90 wt. percent aqueous methanol, filtered and dried. The overnight sample was likewise neutralized, washed with the aqueous methanol, filtered and dried. Both portions of the product were white and powdery. The total yield of product was 265.5 grams.

EXAMPLE II

Example I was essentially repeated except the reaction time at 60°C. was 1.0 hour. The total yield of product was 253 grams.

EXAMPLE III

Example I was essentially repeated except the reaction time at 60°C. was 2.0 hours. The total yield of product was 275 grams.

EXAMPLES IV-IX

Example I was essentially repeated except the hydroxypropyl guar derivatives of Examples B-G were used instead of the derivative of Example A.

EXAMPLE X

Example II was essentially repeated except the locust bean derivative of Example H was used in place of the guar derivative of Example A. The total yield of product was 139.6 grams.

EXAMPLE XI

Portions of each of the products of Examples I-X were dissolved in distilled water and mixed with aqueous calcium chloride. Thickening and/or aggregate formation took place instantaneously. In a typical experiment the carboxyalkyl hydroxyalkyl guar derivative of Example I was dissolved in water at a concentration of 0.75 percent by weight. Such solution had a viscosity of 80 cps. (Brookfield Spindle No. 2, 20 r.p.m., room temperature). After mixing with 20 wt. % aqueous $CaCl_2$ to yield a solution containing 0.3 wt. percent calcium chloride, the viscosity increased to 6,000 cps. At the same concentration level, the product of Example X gave a viscosity reading of about 1,550 when $CaCl_2$ was added at the 0.3 wt. percent level.

EXAMPLE XII

Example XI was essentially repeated with the addition of corresponding amounts of calcium acetate and calcium gluconate. Thickening was again evidenced with all of the products.

EXAMPLE XIII

Example XI was essentially repeated using aqueous solutions of various other divalent and trivalent metal salts. Among those tried were barium chloride, ferrous sulfate, ferric chloride and aluminum chloride. In all cases thickening and/or aggregate formation took place instantaneously.

EXAMPLE XIV

Example XI was essentially repeated. After heating to 39°–40° C., the mixtures gave a viscosity of only about 40 to 50 cps. On cooling, the mixtures gained back their lost viscosity.

The above examples show that the products of the present invention have good thickening properties. As indicated above, they find use as thickening agents (in the form of their complexes with di- and polyvalent metal ions) for a variety of food products including puddings, ice creams, etc.

The embodiments of the invention in which an exclusive property or privilege is claimed are defined as follows:

1. Carboxyalkyl hydroxyalkyl derivatives of polygalactomannans prepared by the process which comprises reacting the polygalactomannan with (1) from about 0.1 to 6.0 equivalents of an alkylene oxide of three to eight carbon atoms in the presence of an alkaline catalyst and (2) from about 55 to 190 parts per 100 parts by weight of the polygalactomannan of a chloro fatty acid reactant selected from chloro fatty acids of two to four carbon atoms and the alkali metal salts thereof, said latter reaction being carried out in the presence of an alkali metal hydroxide reaction initiator.

2. The derivatives of claim 1 wherein the polygalactomannan is guar gum, the alkylene oxide is propylene oxide and the same is used in an amount of about 0.4 to 3.0 equivalents per equivalent of the guar gum, the chloro fatty acid reactant is sodium chloroacetate and the reaction initiator is sodium hydroxide and the same is present in an amount of about 20 to 60 parts by weight of the guar gum.

* * * * *